(12) United States Patent
Garay et al.

(10) Patent No.: US 10,943,201 B2
(45) Date of Patent: Mar. 9, 2021

(54) DIGITAL FINGERPRINT ANALYSIS

(71) Applicant: ServiceNow, Inc., Santa Clara, CA (US)

(72) Inventors: Ivan Rodrigo Garay, Santa Clara, CA (US); Erick Koji Hasegawa, Redwood City, CA (US)

(73) Assignee: ServiceNow, Inc., Santa Clara, CA (US)

( * ) Notice: Subject to any disclaimer, the term of this patent is extended or adjusted under 35 U.S.C. 154(b) by 243 days.

(21) Appl. No.: 15/969,596

(22) Filed: May 2, 2018

(65) Prior Publication Data

US 2019/0340004 A1 Nov. 7, 2019

(51) Int. Cl.
*G06Q 10/06* (2012.01)
*G06F 11/34* (2006.01)
*G06N 5/00* (2006.01)
*G06Q 30/00* (2012.01)
*G06F 9/50* (2006.01)
*G06F 9/455* (2018.01)

(52) U.S. Cl.
CPC ..... *G06Q 10/0633* (2013.01); *G06F 9/45558* (2013.01); *G06F 9/5027* (2013.01); *G06F 11/34* (2013.01); *G06F 11/3438* (2013.01); *G06Q 10/06* (2013.01); *G06Q 10/063* (2013.01); *G06Q 10/0639* (2013.01); *G06Q 30/016* (2013.01); *G06N 5/00* (2013.01)

(58) Field of Classification Search
None
See application file for complete search history.

(56) References Cited

U.S. PATENT DOCUMENTS

| | | |
|---|---|---|
| 6,609,122 B1 | 8/2003 | Ensor |
| 6,816,898 B1 | 11/2004 | Scarpelli |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |
| 7,610,512 B2 | 10/2009 | Gerber |
| 7,617,073 B2 | 11/2009 | Trinon |
| 7,689,628 B2 | 3/2010 | Garg |
| 7,783,744 B2 | 8/2010 | Garg |
| 7,890,802 B2 | 2/2011 | Gerber |
| 7,930,396 B2 | 4/2011 | Trinon |
| 7,945,860 B2 | 5/2011 | Vambenepe |
| 7,966,398 B2 | 6/2011 | Wiles |
| 7,984,020 B2 | 7/2011 | Brunswig et al. |
| 8,051,164 B2 | 11/2011 | Peuter |
| 8,224,683 B2 | 7/2012 | Manos |
| 8,266,096 B2 | 9/2012 | Navarrete |
| 8,457,928 B2 | 6/2013 | Dang |
| 8,478,569 B2 | 7/2013 | Scarpelli |

(Continued)

OTHER PUBLICATIONS

U.S. Appl. No. 15/491,131, filed Apr. 19, 2017, Garay.

*Primary Examiner* — Qing Yuan Wu
(74) *Attorney, Agent, or Firm* — Fletcher Yoder PC

(57) ABSTRACT

The disclosed techniques generally relate to the use of action paths comprising sequences of steps performed by a user to efficiently perform tasks or resolve incidents. Action paths as discussed herein may be used to achieve more efficient outcomes, to train new employees, or to anticipate the future needs of a user.

20 Claims, 7 Drawing Sheets

(56) References Cited

U.S. PATENT DOCUMENTS

| | | | |
|---|---|---|---|
| 8,674,992 | B2 | 3/2014 | Poston |
| 8,689,241 | B2 | 4/2014 | Naik |
| 8,743,121 | B2 | 6/2014 | De Peuter |
| 8,887,133 | B2 | 11/2014 | Behnia |
| 9,239,857 | B2 | 1/2016 | Trinon |
| 9,535,737 | B2 | 1/2017 | Joy |
| 9,557,969 | B2 | 1/2017 | Sharma |
| 9,792,387 | B2 | 10/2017 | George |
| 9,819,729 | B2 | 11/2017 | Moon |
| 2006/0167738 | A1* | 7/2006 | Spear .................... G06Q 10/06 340/573.1 |
| 2013/0281077 | A1 | 10/2013 | Zou et al. |
| 2016/0350673 | A1* | 12/2016 | Kumar .................. G06N 20/00 |

\* cited by examiner

DIGITAL FINGERPRINT ANALYSIS

BACKGROUND

This section is intended to introduce the reader to various aspects of art that may be related to aspects of the present disclosure, which are described and/or claimed below. This discussion is believed to be helpful in providing the reader with background information to facilitate a better understanding of the present disclosure. Accordingly, it should be understood that these statements are to be read in this light, and not as admissions of prior art.

Enterprise networks, systems, and other related processes may utilize software and hardware resources, often implemented on multiple, inter-connected devices, to conduct activities or otherwise perform the activities of various enterprise operations. Provisions, configurations, expansion, maintenance, and normal use of such resources, as well as related systems, may give rise to unexpected issues and may lead to an incident being generated in response to such issues. In such cases, a customer service agent may help to resolve the issue. However, different customer service agents may perform different actions, or the same actions in different sequences to resolve the same type of incident, which may lead to different efficiency metrics and timeliness of resolution.

In addition, different users themselves, even absent a problem or issue, may often perform the same or related tasks using different steps or a different sequence of the same steps. Such different approaches to the task invariably lead to some users performing the task in a less efficient manner.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The disclosed techniques generally relate to identifying the most efficient sequence of steps to resolve an incident (or otherwise perform a task), in some instances, based on previously identified action paths. By way of example, in an incident resolution context, when an incident is generated, the request may be sent to an agent and the agent may resolve the incident by taking one or more steps, which may be recorded as an action path to resolve the incident. Notably, the one or more steps may also be tracked, monitored, and/or detected, among other possibilities. A record of various agents and their action paths with respect to a given type of incident, or more generally, a task, may be maintained in one or more databases. These action paths may be analyzed in response to future occurrences of a given incident to determine the most efficient steps to take to resolve the incident, such as the minimum number of steps to close the incident. A resolution generator performing such functions may provide the recommended shortest action path with potentially the minimum number of steps to achieve a resolution for a given incident to a service agent or user.

Additionally, the action paths of steps taken repeatedly or regularly by a user may be maintained or digitally stored as a fingerprint for the user, possibly with respect to the incident or task. Determining and comparing fingerprints among users for given tasks may present training opportunities when one user's fingerprint is less efficient than another's, such as where the user takes more steps to close incidents than the other use, and may allow for training of new users to perform a task based on the fingerprints of those users determined to be most efficient at the activity. In some instances, the training opportunities may include opportunities to utilize scoped applications, various modules of the scoped applications, and specific functions of a release and/or an upcoming release, particularly to close incidents more efficiently.

Moreover, analyzing a fingerprint for a user may present opportunities for anticipating future action paths, which may allow for content or screens to be suggested or pulled up more quickly or even prior to being requested (e.g., anticipatory content or screen delivery) based on known next actions in a given user's fingerprint. For example, based on collecting a series of data paths and/or fingerprints for a user or analyzing a history of their fingerprint over time, a next step in an action path may be predicted for the user based on the previous steps taken by the user. Further, in some examples, the next step in an action path may change from a given step to another based continuously collecting the series of data paths and/or fingerprints, analyzing modifications to the fingerprints over a period of time, among the other analyses noted herein.

Furthermore, computer generated intelligent virtual agents may utilize the action path associated with the digital fingerprint to recommend efficient steps for a given task. In doing so, the intelligent virtual agents may recommend steps to close incidents more efficiently and/or take some steps in the fingerprint to expedite a task or otherwise facilitate steps being performed by a user, communicate the steps taken, or a combination thereof. The virtual agents may also determine efficient steps that may be taken automatically (e.g., calculations) and steps that may require manual inputs (e.g., login and password) potentially from one or more users. The virtual agents may also perform the automatic steps without user inputs for further efficiency.

BRIEF DESCRIPTION OF THE DRAWINGS

The description herein makes reference to the accompanying drawings, wherein like reference numerals refer to like parts throughout the several views.

DETAILED DESCRIPTION

Figure 1:
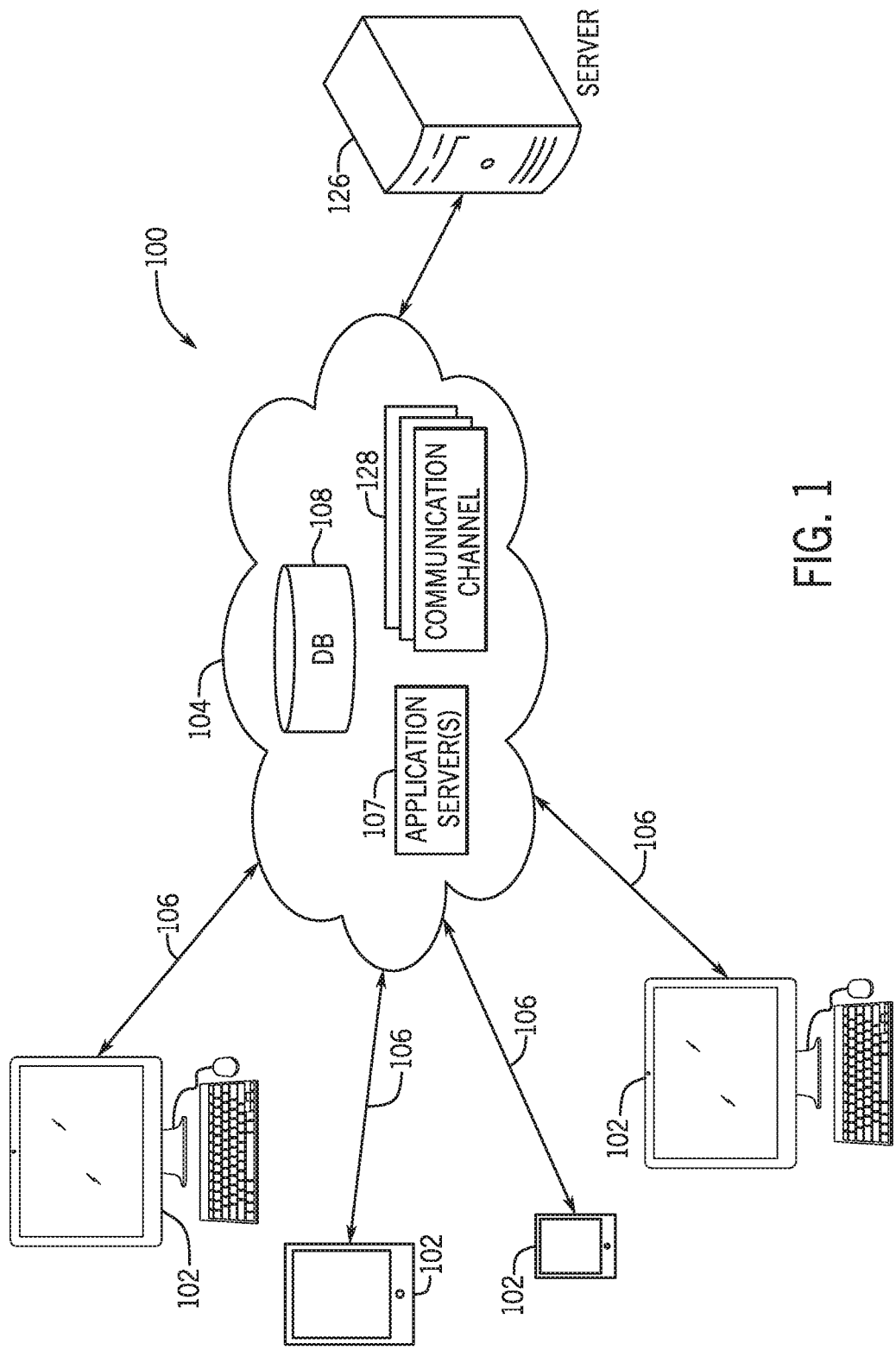
FIG. 1 is a block diagram of a distributed computing system utilizing a platform and a database (DB), in accordance with an embodiment.

One or more specific embodiments will be described below. In an effort to provide a concise description of these embodiments, not all features of an actual implementation may not be described in the specification. It should be appreciated that in the development of any such actual implementation, as in any engineering or design project, numerous implementation-specific decisions may be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Information Technology (IT) networks may include a number of computing devices, server systems, databases, and the like that generate, collect, store, and distribute information. IT is increasingly important in an electronics-driven world in which enterprise systems utilize computers to conduct operations and help run their enterprise processes. As an increasing number of functions are performed through interactions with electronic devices using a common platform to coordinate activities, the complexity of IT network management increases.

As an example, various applications, databases, or hardware may encounter an error, an unexpected behavior result, or another problem in performing an operation on a device or application, with such events being referred to generally herein as incidents. An incident may also refer to an unplanned interruption to an IT service or reduction in the quality of an IT service. As used herein, an agent refers to a user agent and/or a computer generated intelligent virtual agent. When an incident is generated for resolution, an IT agent may try to resolve the issue using his or her own prior knowledge and training. In such a context, the steps taken to address an incident may vary widely based on the training, experience, and history of the agent with respect to a given type of incident. That is, different agents tasked with resolving the same type of incident may do so by performing different operations (e.g., steps) or a different sequence of operations. This in turn may result in different resolution outcomes or in different times associated with resolving an incident.

Accordingly, in some embodiments, more efficient incident or issue resolution may be achieved by tracking, monitoring, and recording the steps taken by multiple agents (e.g., virtual agents) to resolve incidents. In this context, the steps or actions taken by an agent over time constitute an action path, which may be stored in a database or other data repository for analysis and/or future access. The database may track action paths associated with different types of incidents or tasks and the stored action paths may be analyzed as discussed herein to determine the shortest path (e.g., the minimum number of steps) for resolving a described incident or for otherwise reaching a desired outcome or result. The database may be queried to retrieve the shortest action path to resolve a given incident using a description of the incident, which may be provided by agent or may be automatically generated in response to the agent being assigned the incident or resolution task. By providing a known shortest path of steps needed to resolve an incident (e.g., the minimum number of steps), one or more additional steps may be avoided, leading to a more timely and efficient resolution.

As may be appreciated, action paths as discussed herein may be used in other contexts. For example, determining the shortest action path for launching a given application may be helpful in comparing and/or determining efficiency among users that perform the same or similar daily tasks, potentially users with similar job titles. For example, users in certain enterprise contexts, such as human resources (HR), may be assigned a task, such as entering a new employee into the organizations records or payroll system. Thus, the shortest action path determined from the stored action paths associated with different users may be used to determine the most efficient set of steps for performing a task or resolving an incident. The most efficient set of steps for performing a given task may then be propagated to users performing that task to improve their efficiency. Similarly, actions paths identified in this manner may be used in training new employees so such employees start out by learning efficient steps for performing assigned tasks.

Further, in another embodiment, analyzing fingerprints (e.g., stored action paths for respective users) may be used to anticipate content being navigated to by a user for which a fingerprint is known or to otherwise pre-load or perform one or more actions in the user's fingerprint based on the currently performed steps. Anticipating user steps in this manner may result in increased efficiency by reducing time to a given outcome.

It should be noted that although examples provided herein may be presented generally in an IT context, such as using the present techniques to facilitate incident resolution by IT agents in an IT Service Management, IT Operations Management, and/or IT Business Management context, the techniques in this disclosure may be applied to other systems, entities, and/or contexts, such as may relate to human resources systems, accounting systems, legal systems, and so forth.

With the preceding in mind, FIG. 1 is a block diagram of a system 100 that utilizes distributed computing and that may be used in conjunction with the approaches discussed herein employing action path analysis. As illustrated in this simplified example, one or more clients 102 communicate with a platform 104 (e.g., a cloud service) over a communication channel 106. Each client 102 may include any suitable computing system, such as a mobile phone, a tablet computer, a laptop computer, a notebook computer, a desktop computer, or any other suitable computing device or combination of computing devices. Each client 102 may include client application programs running on the computing devices.

The platform 104 may include any suitable number of computing devices (e.g., computers) in one or more locations that are connected together using one or more networks. For instance, the platform 104 may include various computers acting as servers in datacenters at one or more geographic locations where the computers are connected together using network and/or Internet connections. The communication channel 106 may include any suitable communication mechanism for electronic communication between each client 102 and the platform 104. The communication channel 106 may incorporate local area networks (LANs), wide area networks (WANs), virtual private networks (VPNs), cellular networks (e.g., long term evolution networks), and/or other network types for transferring data between the client 102 and the platform 104. For example, the communication channel 106 may include an Internet connection when the client 102 is not on a local network common with the platform 104. Additionally or alternatively, the communication channel 106 may include network connection sections when the client and the platform 104 are on different networks entirely or using network connections when the client 102 and the platform 104 share a common network. Although only four clients 102 are shown connected to the platform 104 in the depicted example, it should be noted that platform 104 may connect to any number of clients (e.g., tens, hundreds, thousands, or tens of thousands of clients).

Through the platform 104, the client 102 may connect to various devices with various functionality, such as gateways, routers, load balancers, databases, application servers running application programs on one or more nodes, or other devices that may be accessed via the platform 104. For example, the client 102 may connect to an application server 107 and/or a database (DB) 108 via the platform 104. The application server 107 may include any computing system, such as a desktop computer, laptop computer, server computer, and/or any other computing device capable of providing functionality from an application program to the client 102. The application server 107 may include one or more application nodes running application programs whose functionality is provided to the client via the platform 104.

The database(s) 108 may store, manage, or otherwise provide data for delivering services to the client 102 over the communication channel 106. The database server includes one or more databases (e.g., DB 108) that are accessible by the application server 107, the client 102, and/or other devices external to the databases. In some embodiments, more than a single database server may be utilized. Furthermore, in some embodiments, the platform 104 may have access to one or more databases external to the platform 104 entirely. As discussed herein, one or more of the described databases 108 may store action paths describing steps taken by users of the system 100 in resolving or performing various tasks, such as resolving incidents in an IT context.

Access to the platform 104 at a client site may be enabled by a server 126, such as one or more management, instrumentation, and discovery (MID) servers providing an interface to a client site) via a communication channel 128. The server 126 may include an application program (e.g., Java application) that runs as a service (e.g., Windows service or UNIX daemon) that facilitates communication and movement of data between the platform 104 and external applications, data sources, and/or services. The server 126 may be implemented using a computing device (e.g., server or computer) on the network 112 that communicates with the platform 104.

The application servers 107 may store content accessible by one or more users via one of the clients. For example, the application server 107 may store one or more applications or screens with which one or more of the users may interact.

Figure 2:
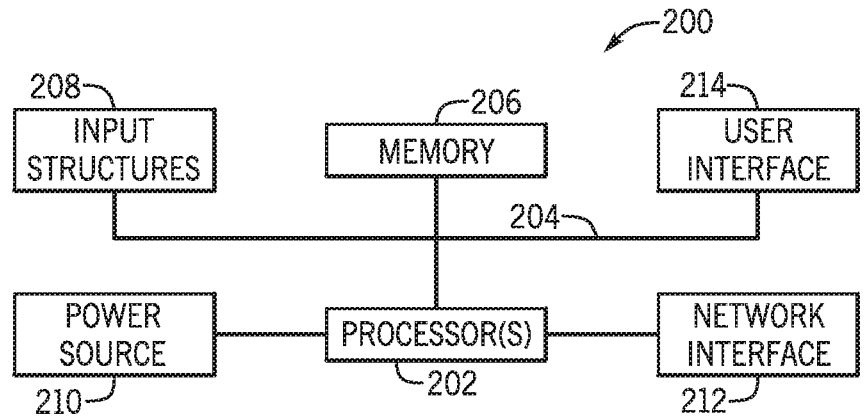
FIG. 2 is a block diagram of a computing device utilized in the distributed computing system of FIG. 1, in accordance with an embodiment.

FIG. 2 generally illustrates a block diagram of example components of a computing device 200 and their potential interconnections or communication paths, such as along one or more busses. As briefly mentioned above, the computing device 200 may be an embodiment of the client 102, the application server 107, a database server (e.g., databases 108), other servers or processor-based hardware devices present in the cloud service 104 (e.g., server hosting the communication queue 128), a device running the server 126, and so forth. As previously noted, these devices may include a computing system that includes multiple computing devices and/or a single computing device, such as a mobile phone, a tablet computer, a laptop computer, a notebook computer, a desktop computer, a server computer, and/or other suitable computing devices.

As illustrated, the computing device 200 may include various hardware components. For example, the device includes one or more processors 202, one or more busses 204, memory 206, input structures 208, a power source 210, a network interface 212, a user interface 214, and/or other computer components useful in performing the functions described herein.

The one or more processors 202 may include processors capable of performing instructions stored in the memory 206. For example, the one or more processors may include microprocessors, system on a chips (SoCs), or any other processors performing functions by executing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206. Moreover, the functions of the one or more processors 202 may be distributed across multiple processors in a single physical device or in multiple processors in more than one physical device. The one or more processors 202 may also include specialized processors, such as a graphics processing unit (GPU).

The one or more busses 204 includes suitable electrical channels to provide data and/or power between the various components of the computing device. For example, the one or more busses 204 may include a power bus from the power source 210 to the various components of the computing device. Additionally, in some embodiments, the one or more busses 204 may include a dedicated bus among the one or more processors 202 and/or the memory 206.

The memory 206 may include any tangible, non-transitory, and computer-readable storage media. For example, the memory 206 may include volatile memory, non-volatile memory, or any combination thereof. For instance, the memory 206 may include read-only memory (ROM), randomly accessible memory (RAM), disk drives, solid state drives, external flash memory, or any combination thereof. Although shown as a single block in FIG. 2, the memory 206 may be implemented using multiple physical units in one or more physical locations. The one or more processor 202 accesses data in the memory 206 via the one or more busses 204.

The input structures 208 provide structures to input data and/or commands to the one or more processor 202. For example, the input structures 208 include a positional input device, such as a mouse, touchpad, touchscreen, and/or the like. The input structures 208 may also include a manual input, such as a keyboard and the like. These input structures 208 may be used to input data and/or commands to the one or more processors 202 via the one or more busses 204.

The power source 210 may be any suitable source for power of the various components of the computing device 200. For example, the power source 210 may include line power and/or a battery source to provide power to the various components of the computing device 200 via the one or more busses 204.

The network interface 212 is also coupled to the processor 202 via the one or more busses 204. The network interface 212 includes one or more transceivers capable of communicating with other devices over one or more networks (e.g., the communication channel 106). The network interface may provide a wired network interface, such as Ethernet, or a wireless network interface, such an 802.11, Bluetooth, cellular (e.g., LTE), or other wireless connections. Moreover, the computing device 200 may communicate with other devices via the network interface 212 using one or more network protocols, such as Transmission Control Protocol/Internet Protocol (TCP/IP), power line communication (PLC), Wi-Fi, infrared, and/or other suitable protocols.

A user interface 214 may include a display that is configured to render visualizations generated by the one or more processors 202. In addition and/or alternative to the display, the user interface 214 may include other devices for interfacing with a user. For example, the user interface 214 may include lights (e.g., LEDs), speakers, and the like.

Figure 3:
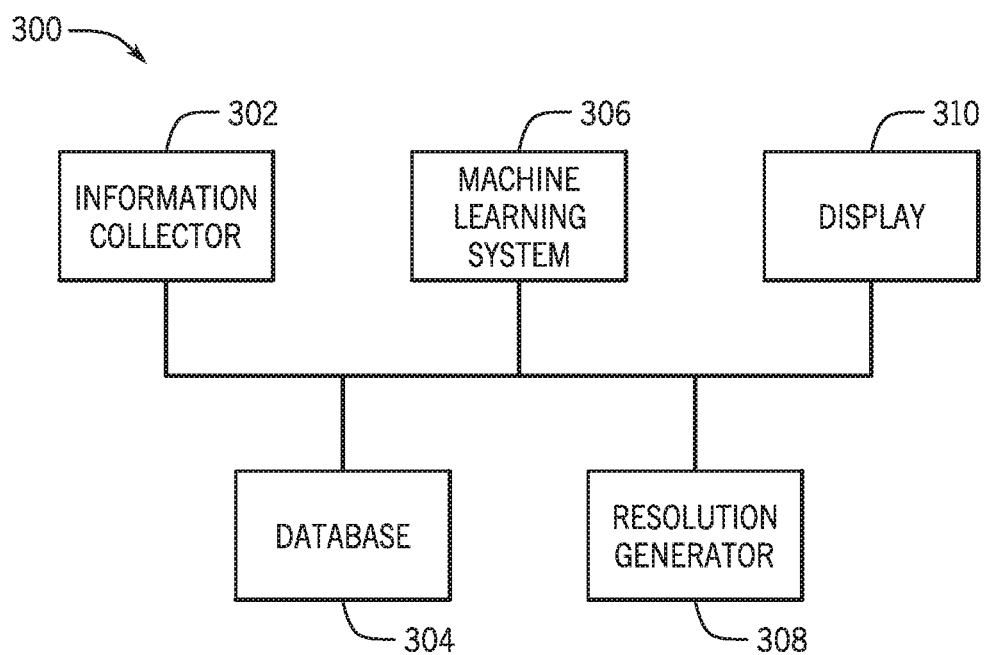
FIG. 3 is a block diagram of an electronic computing device and communication system that utilizes the database (DB) of FIG. 1, in accordance with an embodiment.

As may be appreciated, the device and IT infrastructure features illustrated in FIGS. 1 and 2 and discussed above may be representative of devices and infrastructure used in the generation, analysis and use of action paths as discussed herein, such as to resolve incidents for users of devices in the infrastructure or to otherwise improve the efficiency of tasks performed by such users or agents supporting these users. With this in mind, FIG. 3 is a block diagram of a system 300 that identifies action paths corresponding to a sequence of steps for resolving incidents (or otherwise completing a task) in accordance with implementations of this disclosure. The depicted example of a system 300 includes an information collector 302, a database 108, a machine learning system 306, a resolution generator 308, and a display 310. The computational and communication aspects of the system 300 may be implemented, entirely or in part on a physical or virtualized computing environment or on several such computing environments working in communication with one another, including in a multi-instance computing context in which aspects of the depicted system are implemented in the same or different instances.

In the depicted example and in the context of an IT incident resolution task, the information collector 302 may track, monitor and/or record the data and information associated with a series of steps (e.g., clicks) performed by an agent leading up to resolving an incident. The information collector 302 may track and record descriptive data of an incident, corresponding transaction steps that lead up to a potential incident or issue (e.g., tag or label data of the type of error that caused the incident), assigned agent information (e.g., agent identification), applications accessed by the agent to resolve the incident, an action path including the steps performed by the agent to resolve the incident (e.g., clicks interacting with an application and/or a module related to the application, steps taken to re-parameterize or change the application, steps taken to change or correct a communication or network connection employed by the application, steps taken to adjust or correct communication or operation of a database accessed by the application, and so forth), other data including, but not limited to, data regarding the customer instance, client device, and server device, and any combination thereof. The information collector 302 may be provided or embedded within a customer instance and/or server device supporting or otherwise in communication with such an instance.

The database 108, may receive and store the data and information associated with the steps leading up to a resolution of the incident, such as the steps of an action path taken to resolve an incident. In addition, the database 108 may receive and store the potential resolution options determined via a processor-implemented analysis routine of the machine learning system 306 and generated by the resolution generator 308. The processor-implemented analysis routine of the machine learning system 306 may then query the database 108 for resolution information when a similar incident reoccurs.

The machine learning system 306 interfaces with the database 108 and utilizes data analytics and machine learning techniques to provide for the reorganization and updating of the data and information stored within the database 108. The reorganized and updated data may be received by the information collector 302 and database 108, and utilized by the resolution generator 308 to provide resolution option information. The display 310 receives the resolution options, such as a shortest action path as discussed herein, from the resolution generator 308 and other information associated with the incident and may display this information (or transmit the information as a message) to the agent or a third-party administrator for the resolution of an incident.

As an IT agent performs various steps to resolve a reported incident (e.g., clicking a button or otherwise performing a step within a settings screen, loading up a specific application, applying a patch, and so forth), these steps and any associated information (e.g., description of steps and/or incident) may be automatically tracked, monitored, and/or recorded. These steps and their respective sequence are referred to herein as an action path, and the action paths may be recorded in one or more databases 108 for reference and analysis as discussed herein. In practice, such action paths or combinations of action paths may be represented or envisioned as a tree-type data structure in which nodes on the tree represent steps taken, the links or branches between nodes correspond to the progression from one steps to another, and the terminal or leaf nodes correspond to a resolution of a task for which the steps were performed. With this in mind, when an agent resolves an incident by performing a sequence of steps, this information may be recorded in the database 108 as one possible action path for resolving that type of incident. By analyzing recorded action paths for a given type of incident or task, the machine learning system 306 may identify the optimal action path for resolving that type of incident (and/or completing a given task) efficiently (e.g., the shortest action path with the minimum number of steps), and the resolution generator 308 in the system may transmit instructions or suggestions based on these determinations.

In addition to the stored information associated with the agent's steps and the resulting path information, the agent may also designate a description related to the path (or specific steps) that was taken to resolve the incident. The description may also be automatically formulated via an analysis routine by the machine learning system 306 based on the description parameters associated with an assigned incident to be resolved and then the received resolution action path data. The information associated with the path, and any associated description if present, are utilized by the system (such as the resolution generator 308 of the system 300 of FIG. 3) to generate the potential task or incident resolution options.

Figure 4:
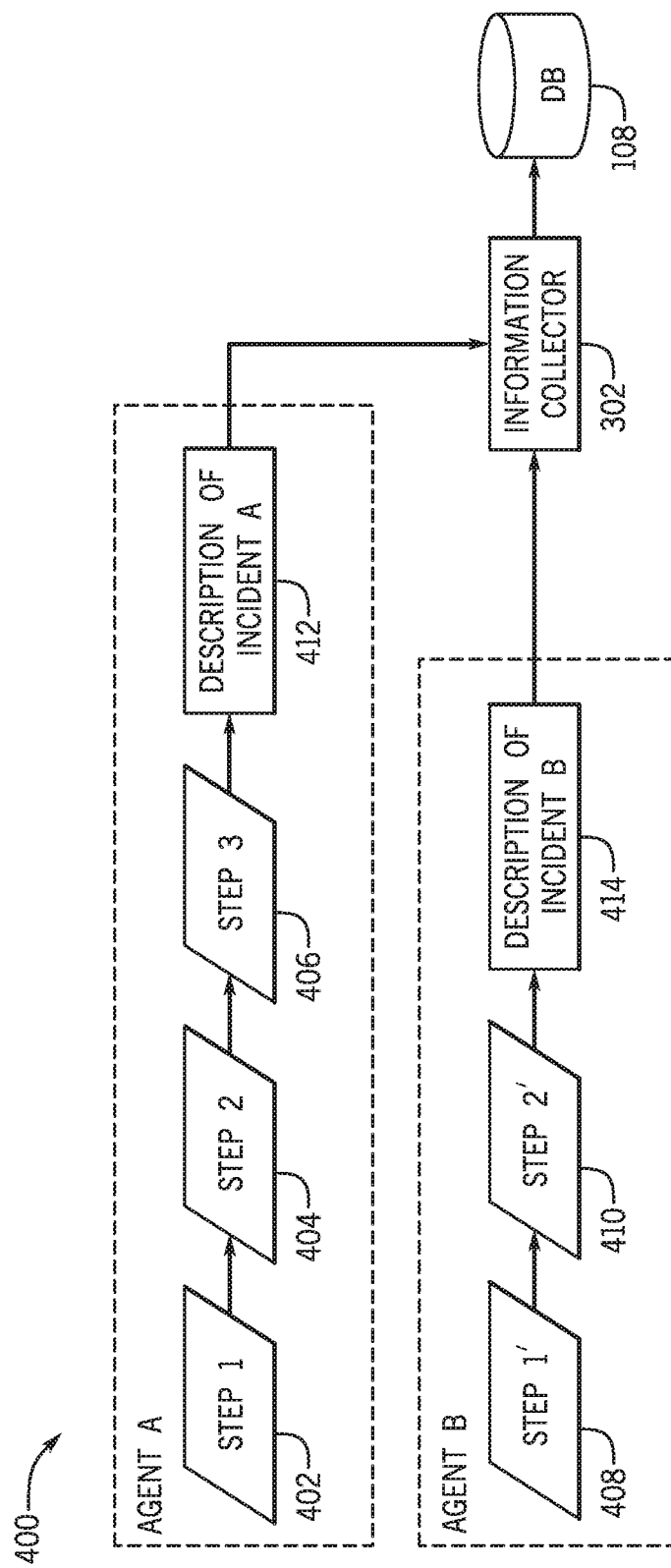
FIG. 4 is a block diagram of a system that identifies action paths and description of incidents, in accordance with an embodiment.

The general process for providing the shortest resolution recommendation includes analyzing or reviewing a collection of action paths taken to resolve a type of incident or to complete a task stored in a database 108, determining the shortest action path taken to resolve the type of incident or completing a task from the collection of action paths, and generating the shortest action path when a request is received. With respect to the collection of action paths stored in a database, FIG. 4 depicts a simplified flow diagram 400 in which two action paths, A and B, are performed. Action paths A and B may each include respective sequences of steps performed. In some examples, the sequences may be performed with two agent accounts with access to an application of a client instance. In another example, the sequences may be performed by two agents (here shown with Agent A and Agent B) to complete a given task or resolve a type of incident (i.e., action paths) along with description information collected in accordance with implementations of this disclosure. The action path of steps and description information may be collected or recorded by an information collector 302. The information collector 302 may be implemented as a software module or set of executable routines that when executed, tracks and records the data and information associated with the series of steps (e.g., clicks) performed by the agents leading up to resolving an incident and the associated incident description information. The incident description information may include information regarding errors causing the incident, source of incident, etc. that may be used to characterize an incident type.

The flow diagram 400 illustrates a collection of information regarding a first step 402, a second step 404, and a third step 406, which taken together in sequence constitute an action path taken to resolve an incident by agent A, and information regarding a first step 408 and a second step 410 (distinguished from the respective steps taken by agent A by prime (') indications), which taken together in sequence constitute an action path taken to resolve an incident by agent B. The first, second, and third steps 402-406 for agent A or first and second steps 408-410 for agent B, are collected as respective action paths as illustrated in FIG. 4. The information regarding the first, second, and third steps 402-406 for agent A and first and second steps 408-410 for agent B, may include agent steps performed to complete a task or resolve an incident. Additional information regarding each step may also be collected including but not limited to timestamp information and location information. Information associated with the various steps may include, but is not limited to, agent commands (such as updating code in a specific area of the customer instance), entering data or parameters into one or more fields of an application or program, selecting or clicking an interface element, and so forth.

In some implementations, after the agent takes the last step in resolving an incident or otherwise performing a task, the agent may provide a description of the type of incident for which the corresponding action paths are being collected by the information collector 302 or the description may be automatically generated by the machine learning system 306 based on the assigned task data (e.g., description of incident assigned for incident request). The description data, if collected, may be sent for storage to DB 108. Thus, the description of incident A 412 or description of incident B 414 may be manually submitted or automatically generated, and may be associated with information about the agent's actions (e.g., the first, second, third steps 402-406 or the first and second steps 408-410.) The description of incidents 412-414 may also include additional information, such as information regarding the type of incident, errors causing the incident, and/or source of the incident.

After the action paths, the description, and any additional information are collected (e.g., by information collector 302) and submitted, they may be stored in a data structure within a database (e.g., DB 108). As illustrated by the actions paths of agent A, which consists of three steps and agent B, which consists of two steps, incident resolution may occur via a different number of steps in an action path for different agents and/or for different incidents. Correspondingly, different agents may have different (e.g., shorter or longer) action paths when resolving the same incident.

Figure 5:
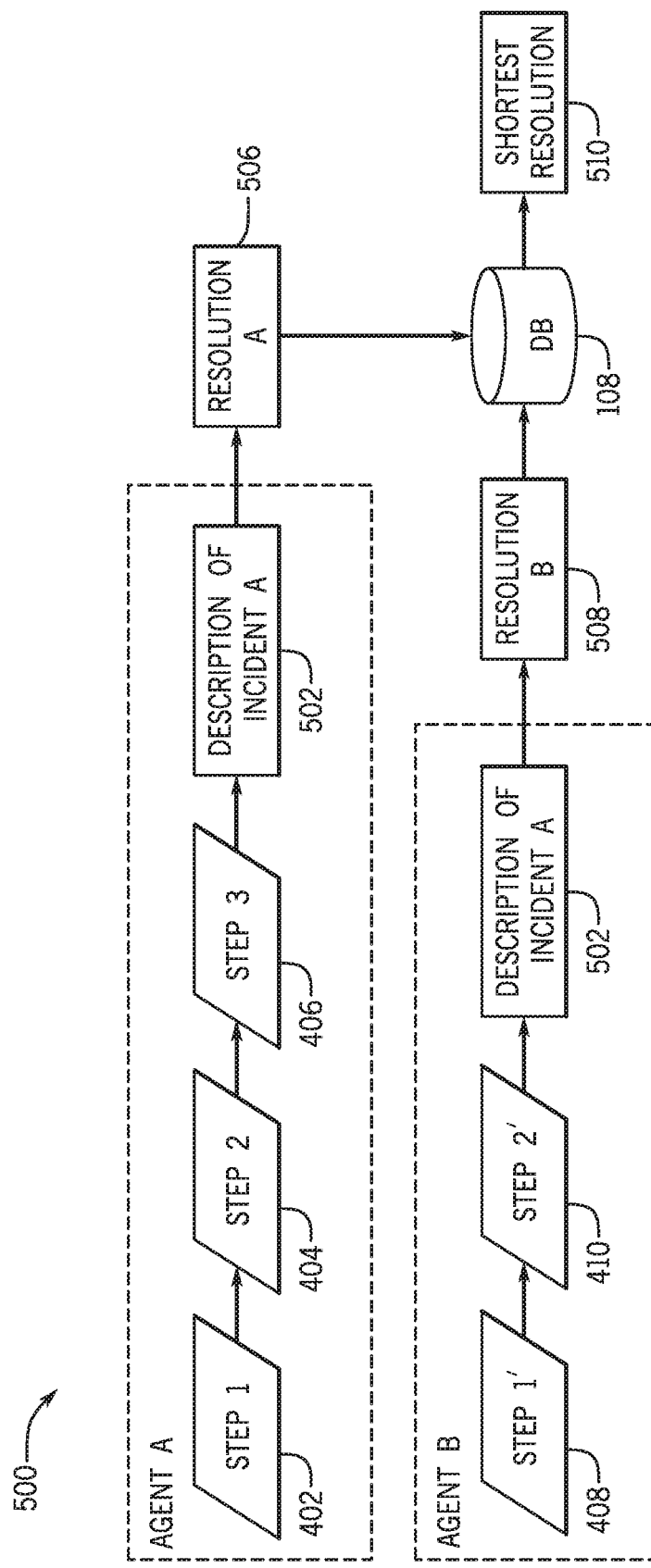
FIG. 5 is a block diagram of a system that identifies the shortest resolution in a database of resolutions to resolve an incident type in the distributed computing system of FIG. 1, in accordance with an embodiment.

Data structure 500 corresponding to action paths describing the paths taken by different agents to resolve the same incident in different ways is shown in a block diagram FIG. 5.

Thus, although in the depicted example, agent A's and agent B's action paths differ, the same type of incident is resolved. Both action paths may be stored in DB 108 and the most efficient path that resolves the incident (e.g., shortest resolution 510 in the depicted example) may be determined, such as by a resolution options module or algorithm, such as the resolution generator 308 illustrated in FIG. 3.

In one implementation, the shortest resolution 510 is the action path having the fewest steps or steps that successfully resolves the incident or otherwise completes a referenced task. However, in other implementations, the shortest resolution 510 may instead refer to the action path that takes the least time to successfully resolve the incident or otherwise complete the referenced task. Other optimizations may include limiting the number of people or agents needing to participate in the resolution or task completion process, limiting the number of steps needing to be performed by the customer or client, limiting the impact on client, platform, or instance computation resources, and so forth.

As mentioned previously, the determination of similarities between action paths and incident related information may be carried out by a machine learning system 306 using machine learning algorithms or techniques that analyze historical data and current data. The analysis of historical data and current data may result in comparative data which may be utilized to determine that different paths may result in similar resolutions (e.g., resolutions for the same incident). In some embodiments, the machine learning techniques may include but are not limited to a logistic regression technique, a support vector machine (SVM) technique, a neural network (NN) technique, a restricted Boltzmann machine (RBM) technique, or any combination thereof. The machine learning techniques may also be utilized to reorganize, update, or optimize the data structures or representations (e.g., action paths or knowledge trees generated using such action paths) that are stored in the database of the system for identifying resolutions. Such reorganization may enable identification of more optimal resolutions to facilitate resolution of subsequent incidents based on previous success rates for using a resolution and information collected (e.g., multiple action paths with different number of steps taken to achieve a resolution for the same incident). The information that is collected and associated with an incident resolution performed by an agent (user commands, communications, associated transaction steps, submitted descriptions) may be utilized to determine the most efficient, shortest path for a resolution for a given incident.

In addition, the machine learning techniques may be utilized to guide an agent, such as to avoid a longer action path (e.g., extra steps or time) in resolving an incident. For example, for a given type of incident, if an agent begins to carry out certain steps that the system recognizes as leading to a longer than necessary action path (or otherwise differing from a shortest or optimal action path for incident resolution), the agent may be prompted by the system to resolve the incident via a recommended shortest path for that type of incident. In addition to automated approaches to guided incident resolution, an agent may also query the database, such as by giving a description of the incident, or the database may be queried automatically based on the description associated with an assigned incident to provide a recommended action path to resolve the incident.

After an agent receives and implements the shortest path resolution, the resolution system may, in one embodiment, receive a notification that the incident request has been resolved using the resolution. Conversely, if an indication of incident resolution is not received or an indication that the suggested action path failed to resolve the incident is received, an alternative action path may be provided until the incident is resolved.

Figure 6:
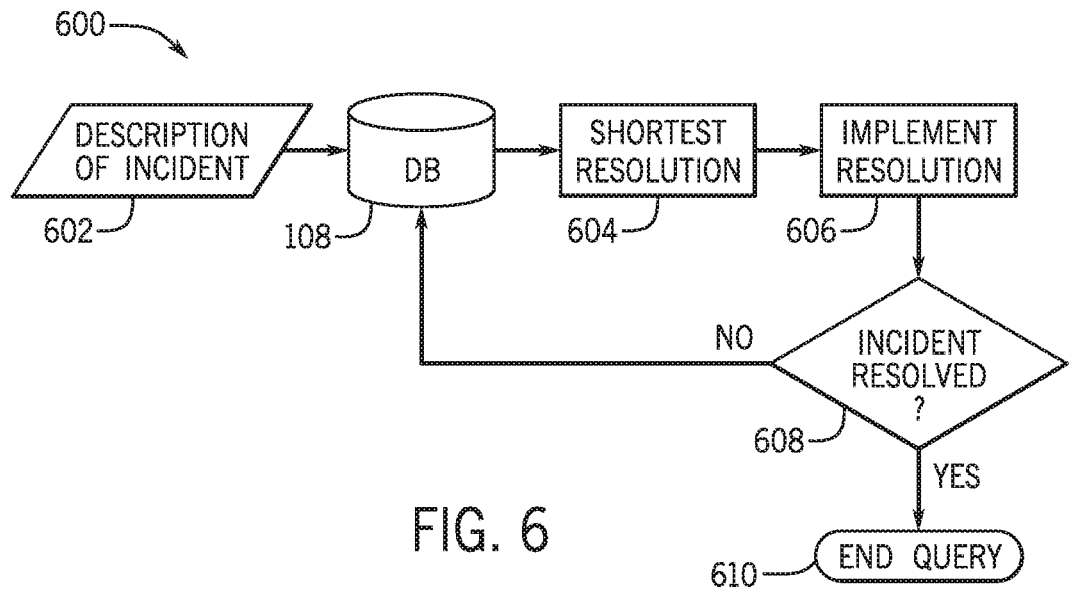
FIG. 6 is a block diagram of a process for querying a database for a shortest resolution action plan and an agent implementing the resolution, in accordance with an embodiment.

To help illustrate, a flow diagram 600 relating a process flow for querying a database for an action path for resolving an incident is shown in FIG. 6. In this example, an agent may be tasked to resolve an incident. Rather than taking steps without guidance, the agent may query the DB 108 to determine the most efficient steps to resolve the incident. In some embodiments, the agent may submit a description of the incident 602 using one or more parameters by which the incidents in the database 108 may be searched or characterized (e.g., information regarding errors causing the incident and incident type) so as to retrieve resolutions (e.g., action paths) for the incident type. Submission of a description may also be performed automatically via a processor based analysis routine based on keywords, metrics, or other parameters provided in a report of the incident. As noted above, the DB 108 may contain multiple action paths for incidents and the paths may be grouped according to the description of incident 602. In this manner, when the DB 108 is queried with respect to a particular type of incident, one or more retrieval algorithms may search all action paths for ones corresponding to the referenced type of incident and a suitable shortest or otherwise optimal action path, if one exists, may be retrieved (e.g., the shortest resolution 604).

Once the shortest resolution 604 from the database 108 is generated, the agent can then implement (block 606) the resolution. The agent may apply the action path steps of the shortest resolution 604 and determine if the incident is resolved (decision block 608). If the incident is successfully resolved, the agent may end the query (block 610) and close the incident ticket. The success rate of a generated resolution may be stored in DB 108 and used by the analysis routine of the machine learning system 306 to determine success rates of action paths, optimizing resolution options and the overall system.

However, the agent may find that the shortest resolution 604 does not solve all aspects of the particular incident assigned upon implementation and may need to query the DB 108 again for another resolution. Failure to resolve an incident may occur if the description of the incident was incorrect when submitted by the agent and/or if the description(s) in the database 108 were incorrect or ambiguous. As illustrated, the agent may query the same description of an incident 602 for other action path options that may not be the shortest resolution 604, or the agent may change the description of incident 602 and start a new query to search for the shortest resolution 604 in the DB 108.

In addition to identifying the shortest action path for IT management and service agents to resolve incident tickets, action paths may more generally be used, as discussed herein, to determine efficiency of an agent over time via a fingerprint that is unique to an agent for a given application, task, or set of tasks. For example, various application users within an organization may belong to the same group or classification (e.g., a job classification or title) and thus, may perform similar steps (i.e., take similar action paths) when beginning a task or performing a set of tasks. Thus, in some embodiments, as an agent's action paths are repeated and stored in DB 108 over time, a given action path for performing a task may be determined to be characteristic for that user, effectively serving as a fingerprint for that user and task or set of tasks. A fingerprint may be indicative of the user performing the same action path at intervals (e.g., when performing a task or set of tasks, when starting their work day, when first logging in to their workstation, and so forth) to achieve the same end result.

For example, agent A and agent B may belong to the same incident resolving group and may open the same applications daily to start resolve incoming incident reports. To do so, both agents may open a series of applications such as an incident report management application (or particular windows or screens within such an application), launch a personal information manager (e.g., email application that also includes a calendar, task manager, note taking, etc.), launch a web browser, and so forth. The action paths for both agent A and agent B corresponding to the sequence (and possibly timing) by which they typically open their applications or perform other tasks are stored in DB 108, and as an action path is repeated (e.g., more than once) over time, the DB 108 may store the characteristic action path as a fingerprint unique to the agent (e.g., using an identification). Since both agent A and agent B are in the same incident resolving group and likely launch the same applications to resolve incidents, their fingerprints may be compared for efficiency.

Figure 7:
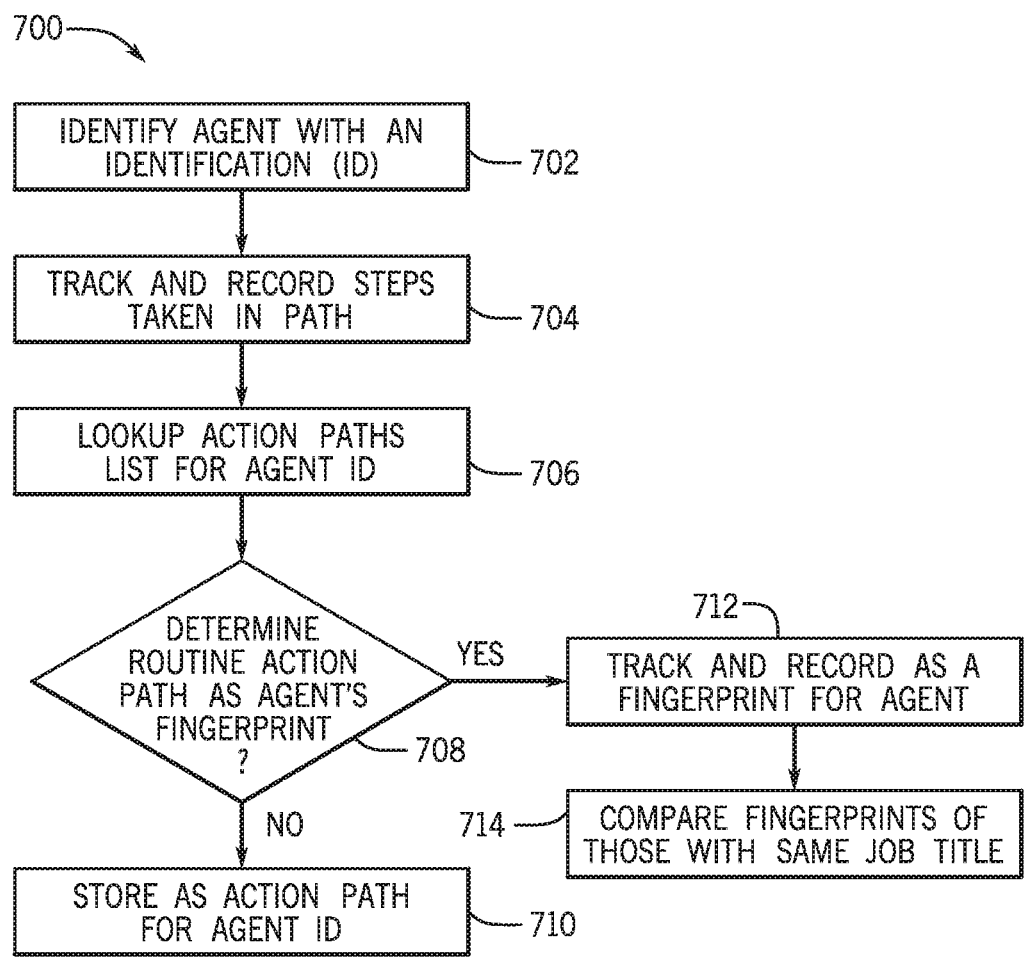
FIG. 7 is a flow diagram of a process for determining fingerprints, in accordance with an embodiment.

To help illustrate, an example of a process 700 employed by the computing device and communication system that utilizes the database 108 of FIG. 3, for creating and comparing fingerprints of a user, is shown in FIG. 7. In some embodiments, the process 700 may be implemented by a processor-implemented analysis routine of the machine learning system 306 that interfaces with the database 108 of stored action paths data received by the information collector 302. The process 700 starts with identifying (block 702) a user identification (ID), which may be a unique login ID used to identify the user. The information collector 302 may track (block 704) and record the steps taken in a path for the specific user ID. The user's current steps making up an action path for the ID may be compared to all the past action paths stored in database 108 for the same ID. The machine learning system 306 may narrow a search for all action paths associated with the user ID to only lookup (block 706) action paths for the user ID related to the user's routine (e.g., a routine action path). In an Information Technology (IT) context, the user routine action path may be an agent's daily routine steps for resolving incident related tasks. In another enterprise context, such as human resources (HR), a user may have a routine including entering a new employee into the organization's records or payroll system and then filling out training forms. The processor-implemented analysis routine of the machine learning system 306 may determine (block 708) whether the routine action path for the ID has been repeated in the past, such that at least one step taken in the past routine action path is the same step taken in the current routine action path. For example, since a user may have a routine action path using three steps in the past, the user may take the same three steps each time for the same routine action path. If the routine action path is determined to be a repeated path for the user ID, then the information collector 302 may track (block 712) and record the routine action path as a fingerprint as determined by the machine learning system 306. If the routine action path is a new action path for the user ID, the action path is simply stored as an action path for the user ID in the database 108. However, if the routine action path is determined to be the user ID's fingerprint, the fingerprint may be compared (block 714) with other fingerprints for other identified users. Fingerprints may be compared when determining efficiency of multiple users with varying action paths for the same routine.

Figure 8:
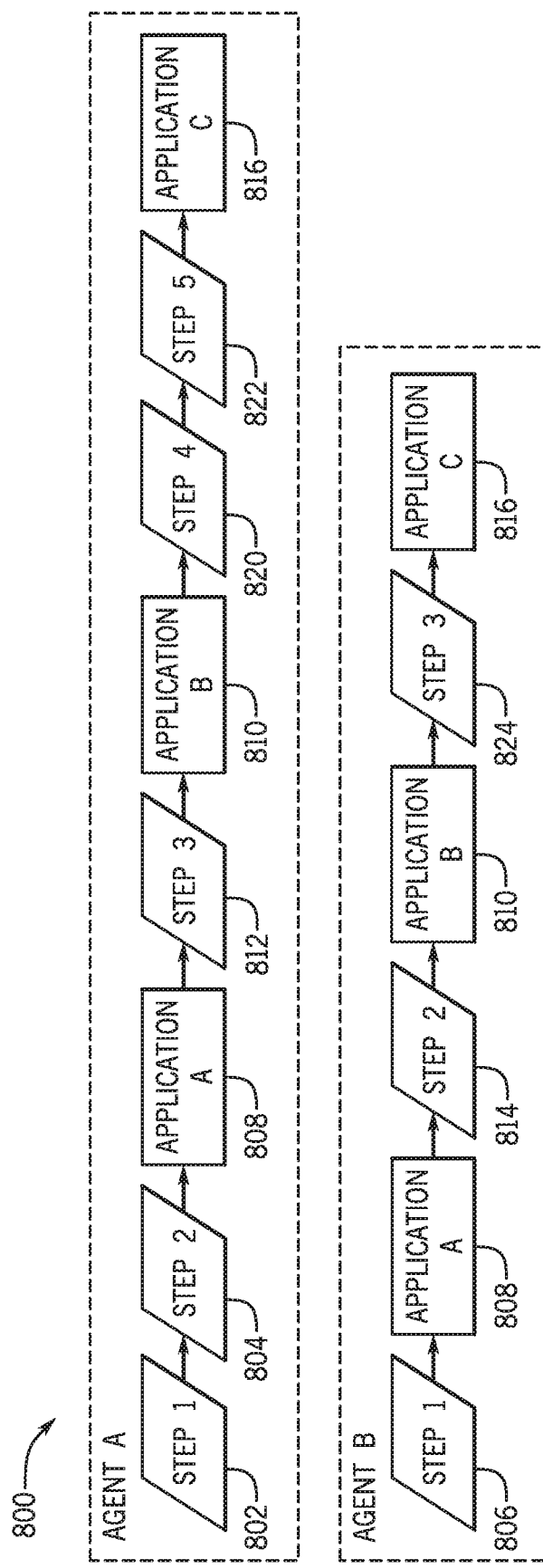
FIG. 8 is a flow diagram of a process for comparing fingerprints to compare user efficiency levels, in accordance with an embodiment.

Multiple users, such as agents, may take varying action paths in their daily routines (e.g., routine for resolving an incident task), creating one or more fingerprints with respect to their routine or tasks performed as part of their routine. To further help illustrate, and turning to FIG. 8, an example of a block diagram 800 is provided showing agents A and B taking different steps (e.g., different action paths) over time as part of a shared routine, here to access an application 816. Their respective different sequences of steps yield different fingerprints that may be compared for efficiency is shown in FIG. 8. In some embodiments, agent A may take a first step 802 and a second step 804 to open a first application, Application A 808, while agent B may take a first step 806 to open the same first application, Application A 808. Thus, agent A takes twice as many steps as agent B to open the same Application A 808, such as an incident report. Further, in the depicted example, agent A takes a third step 812 to launch a second application, Application B 810, while agent B takes a second step 814 to launch the same second application, Application B 810, such as opening a personal information manager. Next, agent A takes a fourth step 820 and a fifth step 822 to launch a third application, Application C 816, while agent B only takes a third step 824 to launch the same third application, Application C 816, such as a web browser. Both agent A and agent B may take these same steps or similar steps in action paths to launch the same applications to resolve assigned tasks, creating their fingerprints. As previously described, agent A's path includes five steps to achieve the result of launching application A 808, Application B 810, and Application C 816. Agent B's path includes only three steps to launch the same Application A 808, Application B 810, and Application C 816. Thus, a series of repeated routine action paths by an agent (e.g., action paths taken more than once to launch the same applications more than once) may be designated as a fingerprint unique to the agent (e.g., based on some agent identification, such as a login ID), and further, the fingerprints may be compared to other fingerprints of comparable agents or users tasked with achieving the same results to determine relative efficiencies. The process 800 of creating fingerprints based on action paths stored in the DB 108 may be implemented in a processor based analysis routine of the machine learning system 306.

By analyzing the various fingerprints stored in DB 108 over time, the system (e.g., a machine learning system 306) may help identify inefficiencies based on fingerprints and may recommend or train operators to use more efficient action paths, thereby removing or remediating identified inefficiency.

Analyzing fingerprints may be used to determine efficiency among those with the same job title, as previously mentioned, but may also be used for training purposes that may be utilized by various groups, such as IT agents in the same group or human resources (HR) training new employees. Since a new employee may be required to perform comparable tasks to others having a similar job or job description, it may be useful to train new employees to perform a task or set of tasks based on a fingerprint determined to be the most efficient for the respective task(s).

Figure 9:
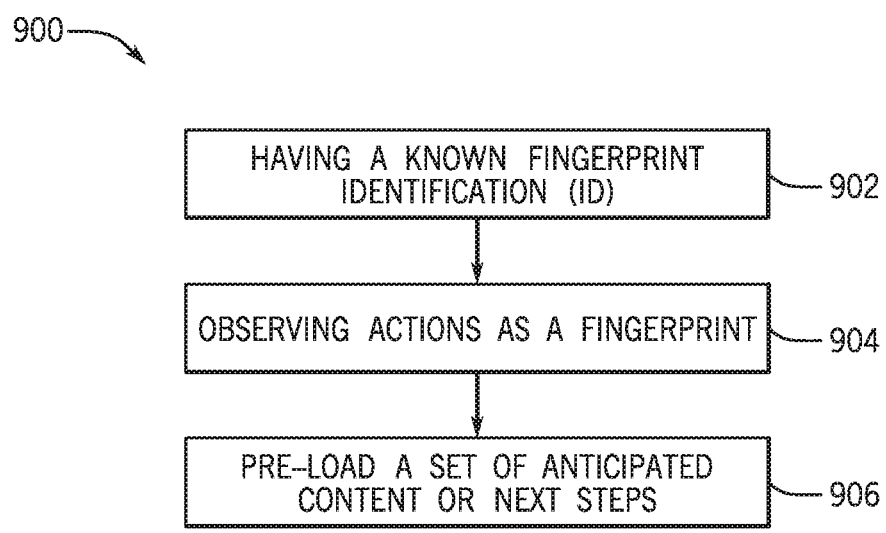
FIG. 9 is a flow diagram of a process for predicting the next step in a fingerprint, in accordance with an embodiment.

Further, studying existing fingerprints for an agent or operator may be useful for anticipating the needs of an operator and pre-loading anticipated content or suggesting a likely next step, which may further improve efficiency and speed. To help illustrate, an example of process 900 for predicting steps in a user's fingerprint is shown in FIG. 9.

In some embodiments, the process 900 may be implemented by a processor-implemented analysis routine of the machine learning system 306 that interfaces with the database 108 of stored fingerprints data received by the information collector 302. The process 900 starts with a given user ID having (block 902) a known fingerprint corresponding to a task or set of tasks. By observing (block 904) steps taken by the user corresponding to steps in the fingerprint (such as opening a program, navigating to a menu selection, and browsing to a folder), the subsequent steps in the fingerprint, which are known, may be used to anticipate the next steps to be taken by the user. The program or analysis routines may therefore, know the likely next steps and pre-load (block 906) a set of anticipated content or suggest the likely next step(s), thereby speeding up the process of preforming the task or accessing the content for the user. A degree of certainty determined for the anticipated next step may determine the anticipatory steps taken by the analysis routines. For example, a certainty of greater than 90% may result in anticipated content being loaded or a program step being performed. Conversely, lesser degrees of certainty (e.g., 60% certainty) may result in a suggestion or ranked list of suggestions being provided for the user to select from.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system for monitoring or supporting an activity executing in a computational instance, the system comprising:
   a server device including a memory, a processor, and a network interface, wherein the memory includes instructions executable by the processor to cause the system to perform operations comprising:
   maintaining a plurality of action paths and associated descriptions on one or more databases, wherein each of the action paths comprise a respective plurality of steps performed by a respective user to complete a task;
   identifying a shortest action path to perform the task from among the plurality of action paths in response to an indication from the computational instance that the task is being performed; and
   providing guidance based on the identified shortest action path.

2. The system of claim 1, wherein the indication comprises a series of steps performed associated with the task.

3. The system of claim 1, wherein providing guidance comprises one or more of indicating an application to navigate to or open or a next step to perform.

4. The system of claim 1, wherein the plurality of action paths and associated descriptions on the one or more databases comprises a collection of action paths and associated descriptions for previously resolved incidents.

5. The system of claim 1, wherein the operations further comprise:
identifying one or more steps of the shortest action path in which a virtual agent of the computational instance is configured to perform;
instructing the virtual agent to perform the one or more identified steps; and
providing guidance with respect to one or more remaining steps of the shortest action path.

6. The system of claim 1, wherein maintaining the plurality of action paths comprises:
recording action paths performed by one or more users in performing one or more tasks;
storing the recorded action paths with descriptions of the respective one or more tasks in the one or more databases.

7. The system of claim 1, further comprising storing an associated user identification with each action path.

8. The system of claim 1, wherein the operations further comprise:
in response to the indication from the computational instance indicating that the task is being performed by the respective user, determining a stored fingerprint corresponding to the respective user and the task, wherein the stored fingerprint comprises the respective plurality of steps of the action paths repeated over time in performing the task by the respective user; and
based on the stored fingerprint, providing a recommendation to the user to facilitate performance of the task.

9. The system of claim 8, wherein the recommendation comprises a preloaded set of anticipated content or suggested next steps.

10. A method for monitoring or supporting a task executing in a computational instance, the method comprising:
maintaining a plurality of action paths and associated descriptions on one or more databases, wherein each of the plurality of action paths comprises a respective plurality of steps taken with a plurality of applications to complete a task;
identifying a shortest action path to perform the task from among the plurality of action paths, wherein the shortest action path comprises less steps than at least one other action path from the plurality of action paths maintained;
detecting from the computational instance a request to perform the task; and
performing one or more steps of the shortest action path to perform the task.

11. The method of claim 10, wherein the request is automatically generated in response to a determination that a series of steps of the task are being performed.

12. The method of claim 10, further comprising one or more of indicating an application to navigate to or open or a next step to perform.

13. The method of claim 10, wherein the plurality of action paths and associated descriptions on the one or more databases comprises a collection of action paths and associated descriptions for previously resolved incidents.

14. The method of claim 10, comprising:
in response to an indication from the computational instance indicating that the task is being performed by a user, determining a stored fingerprint corresponding to the user and the task, wherein the stored fingerprint comprises the respective plurality of steps of the plurality of action paths repeated over time in performing the task by the user; and
based on the stored fingerprint, providing a recommendation to the user to facilitate performance of the task.

15. The method of claim 14, wherein the recommendation comprises a preloaded set of anticipated content or suggested next steps.

16. A method for monitoring or supporting a routine activity executing in a computational instance, the method comprising:
maintaining a list of action paths on one or more databases, wherein each of the action paths comprise a respective plurality of steps that when repeated over time in performing a task correspond to a fingerprint of one or more respective users;
in response to an indication from the computational instance indicating that the task is being performed by a user, determining a stored fingerprint corresponding to the user and the task; and
based on the stored fingerprint, facilitating performance of the task by the user.

17. The method of claim 16, wherein the fingerprint of the user is used to anticipate steps to be taken by the user by preloading a set of anticipated content or suggesting next steps.

18. The method of claim 16, further comprising:
determining a shortest fingerprint from among stored fingerprints for performing a respective task; and
providing the shortest fingerprint for training purposes to new users or users who do not currently perform the respective task using the steps of the shortest fingerprint.

19. A non-transitory machine-readable storage medium storing executable instructions that, when executed by a processor, cause operations to be performed comprising:
maintaining a list of action paths on one or more databases, wherein each of the action paths comprise a respective plurality of steps that when repeated over time in performing a task correspond to a fingerprint of one or more respective users;
in response to an indication from a computational instance indicating that the task is being performed by a user, determining a stored fingerprint corresponding to the user and the task; and
based on the stored fingerprint, facilitating performance of the task by the user.

20. The non-transitory machine-readable storage medium of claim 19, wherein the fingerprint of the user is used to anticipate steps to be taken by the user by preloading a set of anticipated content or suggesting next steps.

* * * * *